(No Model.)

J. E. CRAWLEY.
FILTERING DEVICE.

No. 537,020. Patented Apr. 9, 1895.

Witnesses:
Geo. W. Lowry
Henry Dankert

Inventor:
James E. Crawley
By H. G. Underwood
Attorney

UNITED STATES PATENT OFFICE.

JAMES E. CRAWLEY, OF MILWAUKEE, WISCONSIN, ASSIGNOR OF ONE-HALF TO THOMAS L. McGREGOR, OF SAME PLACE.

FILTERING DEVICE.

SPECIFICATION forming part of Letters Patent No. 537,020, dated April 9, 1895.

Application filed December 19, 1894. Serial No. 532,287. (No model.) Patented in Canada July 25, 1894, No. 46,648.

*To all whom it may concern:*

Be it known that I, JAMES E. CRAWLEY, a citizen of the United States, and a resident of Milwaukee, in the county of Milwaukee and State of Wisconsin, have invented certain new and useful Improvements in Filtering Devices, (for which Letters Patent of the Dominion of Canada, No. 46,648, were granted July 25, 1894;) and I do hereby declare that the following is a full, clear, and exact description thereof.

My invention relates to devices for filtering water, and consists in certain peculiarities of construction and combination of parts as will be fully set forth hereinafter and subsequently claimed.

Figure 1:
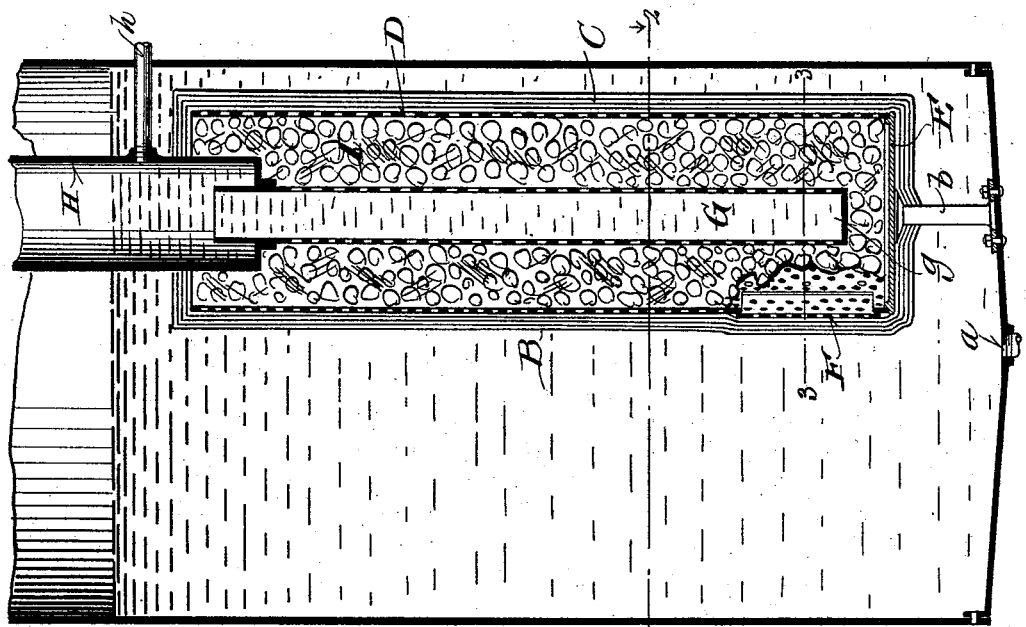
Figure 3:
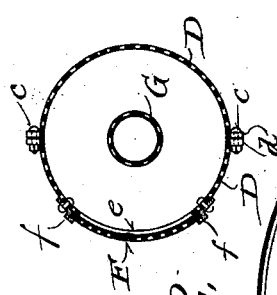
Figure 2:
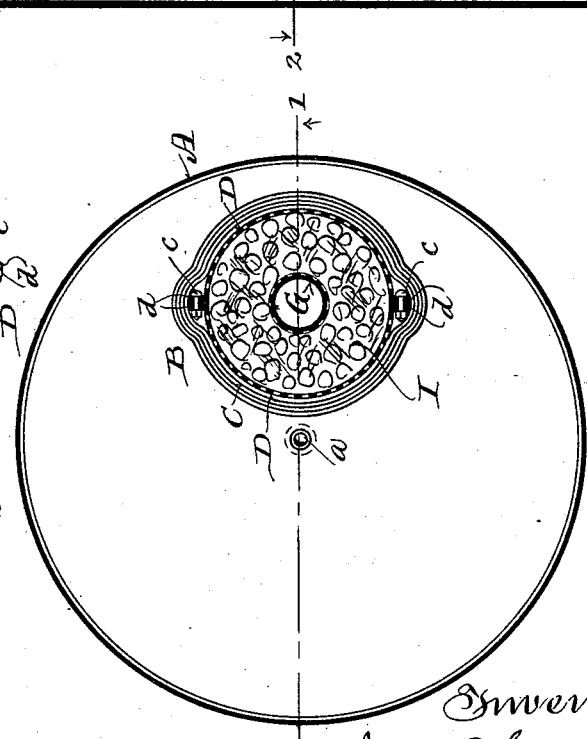

In the drawings: Figure 1 is a vertical central section through a device embodying my invention taken on the line 1—1 of Fig. 2. Fig. 2 is a horizontal sectional view on the line 2—2 of Fig. 1. Fig. 3 is a detail sectional view on the line 3—3 of Fig. 1.

Referring to the drawings, A represents a tank of any suitable construction, that shown being of the class known as vertical tanks and such as are sometimes used in feed-water heaters, having a water-pipe $a$ at the bottom.

B designates my filter which latter is also here shown as of the vertical class, and is preferably supported within the tank A by means of a post or standard $b$, as shown. The exterior of this filter is composed of suitable coarse textile material C, preferably burlaps, wound continuously round a perforated metal tube, formed of two or more sections D D (two of such sections being shown in the present drawings, but the number being immaterial, as from two to six may be used, according to the size of the tube) which sections are formed with edge flanges, $d$ $d$, secured together by bolts $c$, at intervals, and the burlaps C being wound in as many layers as desirable, fifteen layers being frequently employed.

The bottom of the sectional metallic tube D D, is closed by a solid plate E, and adjacent thereto one of the sections D is cut out, to form a door-way as shown at $e$, protected by a perforated door F, sliding vertically in exterior vertical guide-ways $f$ $f$. In the center of the described tube is a perforated metal pipe G, having a closed bottom $g$, and an open top, said pipe G being supported from a tube H of larger diameter connected to the upper end of the pipe G, and forming a receiver for the filtered water, as afterward explained, said tube H having a suitable outlet pipe $h$, leading outside of the tank A.

The space within the filter between the sectional tube D D and the perforated pipe G is filled with any suitable filtering material I, such as coke, which is filled in before the burlaps has been wound to place, and when it is desired to replenish the filter with fresh coke or analogous material, the burlaps can be unwound and the door F raised, and the old filling thereby removed, and a new filling supplied, before the filter is rewound. The object of making the filter tube in sections D D, bolted together, is to enable the same to be readily taken apart for cleansing or repair, when necessary, the pipe and tube being preferably made of sheet metal.

The operation of my filter will be readily understood from the foregoing description of its construction.

In the form illustrated in the drawings, the tank A is supposed to contain water derived from any ordinary source and after the same passes through the filter to the tube G it rises in the latter, in a purified condition, into the receiver H, from whence it is drawn off, through the pipe $h$, for use.

Having thus described my invention, what I claim as new, and desire to secure by Letters Patent, is—

1. The combination, in a filtering device, of a tank, a perforated tube composed of sections separably secured together, and having a closed bottom and open top, a tubular receiver projecting within the top of said tube, an open topped and closed bottom perforated pipe secured to said receiver and depending within the said sectional tube, a filling of coke or analogous filtering material between said pipe and tube, and an external covering of burlaps or analogous coarse textile material wrapped around the described sectional tube in series of continuous layers.

2. In a filtering device, the combination of a perforated tube composed of sections separably connected together, and having an open top and closed bottom, an opening in one of said sections adjacent to said bottom, a vertically movable door protecting said opening, a vertical perforated pipe secured within the said tube, a filling of coke or analogous filtering material between said pipe and tube, and an external covering of burlaps or analogous coarse textile material wrapped around the described sectional tube in series of continuous layers.

In testimony that I claim the foregoing I have hereunto set my hand, at Milwaukee, in the county of Milwaukee and State of Wisconsin, in the presence of two witnesses.

JAMES E. CRAWLEY.

Witnesses:
H. G. UNDERWOOD,
HENRY DANKERT.